(12) United States Patent
Kim et al.

(10) Patent No.: US 9,254,589 B2
(45) Date of Patent: Feb. 9, 2016

(54) REACTION CONTAINER AND VACUUM HEAT TREATMENT APPARATUS HAVING THE SAME

(75) Inventors: Byung Sook Kim, Seoul (KR); Jung Eun Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/239,750

(22) PCT Filed: Aug. 17, 2012

(86) PCT No.: PCT/KR2012/006568
§ 371 (c)(1),
(2), (4) Date: Feb. 19, 2014

(87) PCT Pub. No.: WO2013/027976
PCT Pub. Date: Feb. 28, 2013

(65) Prior Publication Data
US 2014/0205704 A1    Jul. 24, 2014

(30) Foreign Application Priority Data

Aug. 19, 2011  (KR) .................. 10-2011-0083147

(51) Int. Cl.
*C04B 35/52* (2006.01)
*B29C 43/56* (2006.01)
*B28B 3/00* (2006.01)
*B29C 70/00* (2006.01)
*F27B 5/04* (2006.01)

(52) U.S. Cl.
CPC . *B29C 43/56* (2013.01); *B28B 3/00* (2013.01); *B29C 70/00* (2013.01); *C04B 35/52* (2013.01); *F27B 5/04* (2013.01)

(58) Field of Classification Search
CPC .......... B29C 43/52; B29C 43/54; B28B 3/00; B27B 5/04; C04B 35/52

USPC ............. 264/29.1, 29.5, 29.6, 158, 190, 319; 425/78, 175, 177–178
See application file for complete search history.

(56) References Cited

U.S. PATENT DOCUMENTS

| | | | | |
|---|---|---|---|---|
| 3,007,805 | A | * | 11/1961 | Cline .............................. 501/87 |
| 4,243,471 | A | | 1/1981 | Ciszek et al. |
| 4,476,163 | A | * | 10/1984 | Lersmacher et al. ...... 427/249.6 |
| 5,476,679 | A | * | 12/1995 | Lewis et al. ................... 427/122 |
| 8,951,451 | B2 | * | 2/2015 | Muramatsu et al. ......... 264/29.6 |

FOREIGN PATENT DOCUMENTS

| | | |
|---|---|---|
| JP | 2660515 B2 | 6/1997 |
| JP | 2896563 B2 | 3/1999 |
| WO | WO-2011-048473 A1 | 4/2011 |

OTHER PUBLICATIONS

International Search Report in International Application No. PCT/KR2012/006568, filed Aug. 17, 2012.

* cited by examiner

*Primary Examiner* — Joseph S Del Sole
*Assistant Examiner* — Thukhanh T Nguyen
(74) *Attorney, Agent, or Firm* — Saliwanchik, Lloyd & Eisenschenk

(57) ABSTRACT

Disclose are a reaction container and a vacuum heat treatment apparatus. A method of preparing a reaction container comprises preparing a graphite mixture by mixing first and second graphite powders having particle sizes different from each other, preparing a graphite molded body by pressing the graphite mixture, and processing the graphite molded body. The density of the graphite molded body is in a range of 1.8 g/cm³ to 2.1 g/cm³. A method of preparing a reaction container comprises preparing a graphite molded body by pressing graphite powders, and processing the graphite molded body to prepare the reaction container. A carbon source is impregnated into the graphite molded body or the reaction container, and density of the reaction container is in a range of 1.8 g/cm³ to 2.1 g/cm³.

4 Claims, 1 Drawing Sheet

REACTION CONTAINER AND VACUUM HEAT TREATMENT APPARATUS HAVING THE SAME

CROSS-REFRENCE TO RELATED APPLICATIONS

This application is the U.S. national stage application of International Patent Application No. PCT/KR2012/006568, filed Aug. 17, 2012, which claims priority to Korean Application Nos. 10-2011-0083147, filed Aug. 19, 2011, and 10-2011-0085291, filed Aug. 25, 2011, the disclosures of each of which are incorporated herein by reference in their entirety.

TECHNICAL FIELD

The embodiment relates to a reaction container and a vacuum heat treatment apparatus.

BACKGROUND ART

A vacuum heat treatment apparatus, which heat-treats a source material put in a crucible to form a desirable material, performs the heat treatment in a vacuum state to prevent surrounding contamination. According to the vacuum heat treatment apparatus, an adiabatic member is placed in a chamber maintained in the vacuum state, and a heater is placed in the adiabatic member, thereby heating the source material.

However, the material (reaction product), which is produced in the middle of the reaction due to the reaction between the crucible and the source material, may stick to the inner wall of the crucible. Since the reaction product is different from the material of the crucible, the thermal stress is applied to the crucible due to the thermal expansion coefficient difference between the above heterogeneous materials. In the worst case, the crucible may be broken due to the thermal stress in the middle of the reaction. Therefore, the cost for the replacement of the crucible is excessively increased, so that the productivity may be lowered.

According to the related art, a buffer part is provided in the reaction container so that the reaction product is prevented from being deposited on the inner part of the crucible. Accordingly, the crucible can be prevented from being cracked and damaged due to the thermal expansion difference between the deposited reactant or the deposited product and the crucible.

In addition, according to the related art, the shape of the reaction container is modified, thereby preventing the crucible from being broken and cracked due to the deposition of the reaction product into the crucible. In other words, the thermal expansion difference between the crucible and the reaction product can be compensated by modifying the shape of the reaction container.

However, even though the above scheme is employed, if the reaction product is excessively deposited into the crucible, the crucible may be cracked and broken. In other words, since the thermal expansion coefficient between the heterogeneous materials of the reaction product and the crucible is significantly made, the above schemes have the limitation in preventing the stress applied to the crucible due to the thermal expansion coefficient between the heterogeneous materials.

Therefore, there are required a scheme capable of preventing the crucible from being cracked or broken due to the stress resulting from the thermal expansion difference between the reaction product and the crucible without the modification of the shape or the structure of the crucible.

DISCLOSURE OF INVENTION

Technical Problem

The embodiment provides a reaction container which can be prevented from being broken and a vacuum heat treatment apparatus having the same.

Solution to Problem

According to the first embodiment, there is provided a method of preparing a reaction container. The method comprises preparing a graphite mixture by mixing first and second graphite powders having particle sizes different from each other, preparing a graphite molded body by pressing the graphite mixture, and processing the graphite molded body, in which density of the graphite molded body is in a range of 1.8 g/cm$^3$ to 2.1 g/cm$^3$.

According to the embodiment, there is provided a method of preparing a reaction container. The method comprises preparing a graphite molded body by pressing graphite powders, and processing the graphite molded body to prepare the reaction container. A carbon source is impregnated into the graphite molded body or the reaction container, and density of the reaction container is in a range of 1.8 g/cm$^3$ to 2.1 g/cm$^3$.

According to the first embodiment, there is provided a vacuum heat treatment apparatus comprises a chamber, a reaction container in the chamber, and a heating member to heat the reaction container in the chamber. The reaction container may comprise graphite, and may have density of 1.8 g/cm$^3$ to 2.1 g/cm$^3$.

According to the second embodiment, there is provided a vacuum heat treatment apparatus comprising a chamber, a reaction container in the chamber, and a heating member to heat the reaction container in the chamber. The reaction container may comprise graphite, may comprise a carbon source impregnated in the reaction container, and may have density of 1.8 g/cm$^3$ to 2.1 g/cm$^3$.

Advantageous Effects of Invention

As described above, the reaction container according to the first embodiment can be prepared by pressing and pressurizing graphite powders having two particle sizes.

Therefore, the graphite powder constituting the reaction container comprises a mixture having two particle sizes, so that the density of the reaction container may be increased to 1.8 g/cm$^3$ or more. In addition, as the density of the reaction container is increased, the porosity of the inner part of the reaction container can be reduced.

In addition, the reaction container according to the second embodiment can be prepared by impregnating a carbon source into a molded body.

Therefore, the porosity of the reaction container can be reduced, and the density of the reaction container can be increased to 1.8 g/cm$^3$ or more.

The porosity of the reaction container is reduced, so that SiO gas serving as a reaction product of the mixed source material can be prevented from being infiltrated into the pores. Accordingly, SiC produced due to the reaction between the SiO gas and the graphite of the reaction container can be reduced.

Accordingly, the SiC produced in the reaction container is reduced, thereby preventing the reaction container from being cracked and broken due to the thermal expansion difference between the SiC and the graphite.

Therefore, since the reaction container can be prevented from being cracked and broken, the number of the replacements of the reaction container or the number of the repairs of the reaction container can be reduced when SiC powders are prepared by using the vacuum heat treatment apparatus comprising the reaction container. Accordingly, the preparing efficiency can be more improved, and the cost can be reduced.

MODE FOR THE INVENTION

Figure 1:
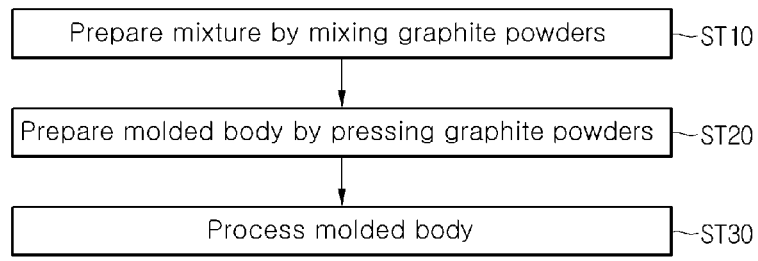
FIG. 1 is a flowchart showing the preparing process of a reaction container according to a first embodiment.

In the description of the embodiments, it will be understood that, when a layer (film), a region, a pad, a pattern, or a structure is referred to as being "on" or "under" another layer (film), another region, another pad, another pattern, or another structure it can be "directly" or over the other layer (film), the other region, the other pad, the other pattern, or the other structure, or one or more intervening layers may also be present.

Since the thickness and size of each layer (film), each region, each pad, each pattern, or each structure shown in the drawings may be modified for the purpose of convenience or clarity of description, the size of elements does not utterly reflect an actual size.

Hereinafter, the embodiment of the disclosure will be described in detail with reference to accompanying drawings.

FIG. 1 is a flowchart showing the preparing process of a reaction container according to the first embodiment.

Referring to FIG. 1, a method of preparing the reaction container according to the first embodiment comprises a step ST10 of preparing a graphite mixture obtained by mixing first graphite powers with second graphite powders having particle sizes different from each other, a step ST20 of preparing a graphite molded body by pressing the graphite mixture; and a step ST30 of processing the graphite molded body. The density of the graphite molded body may be in the range of about 1.8 g/cm$^3$ to about 2.1 g/cm$^3$.

According to the step (step ST10) of preparing the graphite mixture obtained by mixing the first and second graphite powders having the particle sizes different from each other, the graphite mixture can be prepared by mixing the first and second graphite powders having the particle sizes different from each other.

The particle size of the first graphite powder may be in the range of about 5 μm to about 50 μm. In addition, the particle size of the second graphite powder may be in the range of about 0.02 μm to about 2 μm.

According to the step ST20 of preparing the graphite molded body by pressing the graphite mixture, the graphite molded body may be prepared by pressing and molding the graphite mixture. The molded body may be formed through a pressing process based on an extrusion molding scheme or a cold isostatic pressing (CIP) scheme, but the embodiment is not limited thereto. In other words, the graphite molded body may be prepared through various molding schemes.

The density of the graphite molded body may be in the range of about 1.8 g/cm$^3$ to about 2.1 g/cm$^3$. In addition, the porosity of the graphite molded body may be in the range of about 5% to about 20%.

Thereafter, according to the step ST30 of processing the graphite molded body, the graphite molded body is processed in the shape of a reaction container or a crucible, so that the reaction container, which is a final product, can be prepared.

The reaction container comprises the graphite mixture obtained by mixing two kinds of graphite powders (i.e., first and secondo graphite powders) having different particle sizes instead of graphite powders having single particle size distribution, so that the density of the reaction container can be increased.

The conventional reaction container is prepared by using graphite powders having single particle distribution. In this case, the reaction container prepared by using the graphite powders having the single particle distribution may have the density of about 1.6 g/cm$^3$ to about 1.8 g/cm$^3$. In addition, the porosity of the reaction container prepared according to the above scheme may be in the range of about 20% to about 30%.

In this case, the pores between graphite particles of the reaction container may cause the breakage to the reaction container. In other words, when the mixing materials comprising a carbon source and a silicon source therein react with each other, SiO gas may be infiltrated into the reaction container through the pores of the reaction container. In this case, the SiO gas infiltrated into the reaction container through the pores reacts with the graphite to product SiC.

Therefore, the reaction container receives a stress due to the thermal expansion co-efficient difference between the SiC, which is produced in the reaction container, and the graphite, so that that the reaction container may be cracked or broken.

However, the reaction container prepared according to the embodiment is prepared by using the graphite mixture obtained by using two kinds of graphite powders having particle sizes different from each other, so that the density of the reaction container may be 1.8 g/cm$^3$ or more. Preferably, the density of the reaction container may be in the range of 1.8 g/cm$^3$ to 2.1 g/cm$^3$.

Therefore, since the density of the reaction container is increased, the pores formed in the reaction container can be reduced. Preferably, the porosity of the reaction container according to the embodiment may be in the range of 5% to 20%.

Therefore, the pores are reduced, so that the SiO gas, which is produced in the middle of the reaction and infiltrated into the pores of the reaction container, can be reduced. Therefore, since the SiC produced due to the reaction between the graphite of the reaction container and SiO gas is reduced, the reaction container can be prevented from being cracked or broken.

Figure 2:
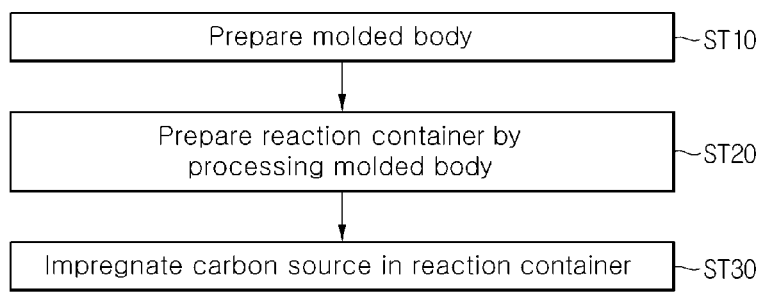
FIG. 2 is a flowchart showing the preparing process of a reaction container according to a second embodiment.

FIG. 2 is a flowchart showing the preparing process of the reaction container according to the second embodiment.

Referring to FIG. 2, the method of preparing the reaction container according to the embodiment comprises a step ST100 of preparing a graphite molded body by pressing graphite powders, a step ST200 of preparing the reaction container by processing the graphite molded body, and a step ST300 of impregnating a carbon source into the graphite molded body or the reaction container. The density of the reaction container may be in the range of about 1.8 g/cm$^3$ to about 2.1 g/cm$^3$.

According to the step ST100 of preparing the graphite molded body by pressing the graphite powders, the graphite molded body may be prepared by pressing and molding the graphite powders.

The molded body may be formed through a pressing process based on an extrusion molding scheme or a cold isostatic pressing (CIP) scheme, but the embodiment is not limited thereto. In other words, the graphite molded body may be prepared through various molding schemes.

Thereafter, according to the step ST200 of preparing the reaction container by processing the graphite molded body, the reaction container, which is a final product, may be prepared by processing the graphite molded body in the shape of the reaction container or the shape of the crucible.

Thereafter, according to the step ST300 of impregnating the carbon source into the graphite molded body or the reaction container, the carbon source may be impregnated into the graphite molded body or the reaction container prepared by processing the graphite molded body.

In the step ST300 of impregnating the carbon source, the carbon source may be directly impregnated into the graphite molded body or the carbon source may be impregnated into the reaction container after the reaction container has been prepared by processing the graphite molded body, and the embodiment is not limited to the sequence thereof.

The carbon source may comprise at least one selected from the group consisting of phenol resin, furan resin, xylene resin, polyimide, polyurethane, polyacrylonitrile, poly (vinyl alcohol), poly (vinyl acetate), cellulose and the mixture thereof. The carbon source comprising the phenol resin may be impregnated into the graphite molded body or the reaction container prepared by processing the graphite molded body by using a capillary phenomenon. Thereafter, the graphite molded body or the reaction container having the carbon source impregnated therein is subject to a carbonization process such as a heat treatment process to carbonize the carbon source, so that 20% to 60% of the carbon source remains.

The porosity of the graphite molded body or the reaction container having the carbon source impregnated therein may be in the range of 5% to 20%. In addition, the density of the graphite molded body or the reaction container may be in the range of about 1.8 g/cm$^3$ to about 2.1 g/cm$^3$.

The carbon source comprising the phenol resin may be infiltrated into graphite particles of the graphite molded body or the reaction container and filled in the graphite particles through the carbonization process.

The porosity of the reaction container can be reduced by impregnating the carbon source into the graphite molded body or the reaction container.

The conventional reaction container is prepared by using graphite powders having single particle distribution. In this case, the reaction container prepared by using the graphite powders having the single particle distribution may have the density of about 1.6 g/cm$^3$ to about 1.8 g/cm$^3$. In addition, the porosity of the reaction container prepared according to the above scheme may be in the range of about 20% to about 30%.

In this case, the pores between graphite particles of the reaction container may cause the breakage to the reaction container. In other words, when the mixing materials comprising a carbon source and a silicon source therein react with each other, SiO gas may be infiltrated into the reaction container through the pores. In this case, the SiO gas infiltrated into the reaction container through the pores reacts with the graphite to product SiC.

Therefore, the reaction container receives a stress due to the thermal expansion co-efficient difference between the SiC, which is produced in the reaction container due to the reaction, and the graphite, so that that the reaction container may be cracked or broken.

However, according to the reaction container of the embodiment, the porosity of the reaction container can be reduced by infiltrating the carbon source into the reaction container so that the carbon source can be filled in the pores of the reaction container. Preferably, the porosity of the reaction container according to the embodiment may be in the range of about 5% to about 20%.

Therefore, the pores are reduced, so that the SiO gas, which is produced in the middle of the reaction of infiltrating the carbon source into the pores of the reaction container, can be reduced. Therefore, since the SiC produced due to the reaction between the graphite of the reaction container and SiO gas is reduced, the reaction container can be prevented from being cracked or broken.

Figure 3:
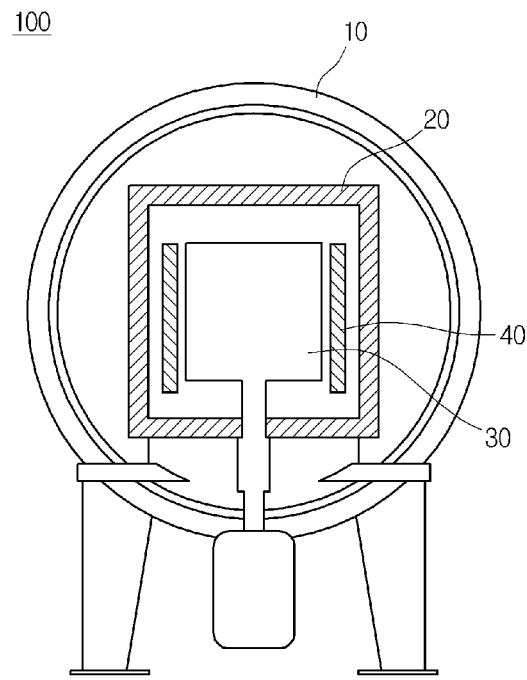
FIG. 3 is a view schematically showing a vacuum heat treatment apparatus according to the embodiment.

FIG. 3 is a schematic view showing a vacuum heat treatment apparatus according to first and second embodiments.

Hereinafter, the heat treatment apparatus according to the first and second embodiments will be described with reference to FIG. 3.

Referring to FIG. 3, the vacuum heat apparatus according to the first embodiment comprises a chamber 10, a reaction container 30 provided in the chamber 10, and a heating member 40 to heat the reaction container 30 in the chamber 10. The reaction container 30 comprises graphite, and the density of the reaction container 30 may be in the range of about 1.8 g/cm$^3$ to about 2.1 g/cm$^3$.

Hereinafter, the vacuum heat apparatus according to the first embodiment will be described.

Atmosphere gas is injected into an outer portion of the chamber 10 through an atmosphere gas feeding pipe (not shown). The atmosphere gas may comprise inert gas such as argon (Ar) or helium (He).

An adiabatic member 20 positioned in the chamber 10 insulates the reaction container 30 so that the reaction container 30 can be maintained at the temperature suitable for the reaction. The adiabatic member 20 may comprise graphite so that the adiabatic member 20 can resist high temperature.

The reaction container 30 having the mixed source materials filled therein to produce a desirable material through the reaction between the mixed source materials is provided in the adiabatic member 20. The reaction container 30 may comprise graphite so that the reaction container 30 can endure high temperature. In addition, the graphite may comprise graphite mixture obtained by mixing the first and second graphite powders having particle sizes different from each other.

The particle size of the first graphite powder may be in the range of about 5 μm to 50 μm. In addition, the particle size of the graphite powders may be in the range of 0.02 μm to 2 μm. The density of the reaction container made of the graphite mixture may be in the range of 1.8 g/cm$^3$ to 2.1 g/cm$^3$. The porosity of the reaction container may be in the range of 5% to 20%.

The gas produced in the middle of the reaction may be exhausted through an outlet port connected to the reaction container 30.

A heating member is interposed between the adiabatic member 20 and the reaction container 30 to heat the reaction container 30. The heating member can supply heat to the reaction container 30 through various schemes. For example, the heating member applies voltage to graphite so that heat is generated.

The vacuum heat treatment apparatus may be used as an apparatus of preparing SiC in which the SiC is prepared by heating the mixed material comprising the carbon source and the silicon source. However, the embodiment is not limited thereto.

Since the reaction container is prepared by using graphite mixture obtained by mixing two kinds of graphite powders having different particles, the density of the reaction container may be 1.8 g/cm$^3$ or more. Preferably, the density of the reaction container may be in the range of 1.8 g/cm$^3$ to 2.1 g/cm$^3$.

Therefore, since the density of the reaction container is increased, the internal porosity of the reaction container can be reduced. Preferably, the porosity of the reaction container according to the embodiment may be in the range of 5% to 20%.

Therefore, the pores are reduced, so that the SiO gas, which is produced in the middle of the reaction of infiltrating the carbon source in pores of the reaction container, can be reduced. Therefore, since the SiC produced due to the reaction between the graphite of the reaction container and SiO gas is reduced, the reaction container can be prevented from being cracked or broken.

Accordingly, since the reaction container can be prevented from being cracked and broken, the number of the replacements of the reaction container and the number of the repairs of the reaction container are reduced when the SiC powders are prepared by using the vacuum heat treatment apparatus. Accordingly, the preparing efficiency can be increased and the cost can be reduced.

Referring to FIG. 3, the vacuum heat treatment apparatus according to the second embodiment comprises the chamber 10, the reaction container 30 provided in the chamber 10, and the heating member 40 to heat the reaction container 30 provided in the chamber 10. The reaction container 30 comprises graphite, and the density of the reaction container 30 may be in the range of 1.8 g/cm$^3$ to 2.1 g/cm$^3$.

Hereinafter, the vacuum heat treatment apparatus will be described.

Atmosphere gas is injected into an outer portion of the chamber 10 through an atmosphere gas feeding pipe (not shown). The atmosphere gas may comprise inert gas such as argon (Ar) or helium (He).

An adiabatic member 20 positioned in the chamber 10 insulates the reaction container 30 so that the reaction container 30 can be maintained at the temperature suitable for the reaction. The adiabatic member 20 may comprise graphite so that the adiabatic member 20 can resist high temperature.

The reaction container 30 having the mixed source materials filled therein to produce a desirable material through the reaction between the mixed source materials is provided in the adiabatic member 20. The reaction container 30 may comprise graphite so that the reaction container 30 can endure high temperature. In addition, the carbon source can be impregnated into the reaction container.

The carbon source may comprise phenol resin. The carbon source is carbonized through a carbonization process, and the carbonized carbon source may be filled in pores between the graphite powders container in the reaction container.

The porosity of the reaction container having the carbon source impregnated in the reaction container may be in the range of 5% to 20%. In addition, the density of the reaction container may be in the range of 1.8 g/cm$^3$ to 2.1 g/cm$^3$.

Gas produced in the middle of reaction may be discharged through the outlet port connected to the reaction container 30.

A heating member is interposed between the adiabatic member 20 and the reaction container 30 to heat the reaction container 30. The heating member can supply heat to the reaction container 30 through various schemes. For example, the heating member applies voltage to graphite so that heat is generated.

The vacuum heat treatment apparatus may be used as an apparatus of preparing SiC in which the SiC is prepared by heating the mixed material comprising the carbon source and the silicon source. However, the embodiment is not limited thereto.

According to the reaction container, the carbon source is impregnated into the reaction container and filled in the pores of the reaction container. Accordingly, the density of the reaction container may be 1.8 g/cm$^3$ or more. Preferably, the density of the reaction container may be in the range of 1.8 g/cm$^3$ to 2.1 g/cm$^3$.

In addition, the porosity of the reaction container can be reduced. Preferably, the porosity of the reaction container according to the embodiment may be in the range of 5% to 20%.

Therefore, the pores are reduced, so that the SiO gas, which is produced in the middle of the reaction of infiltrating the carbon source into the pores of the reaction container, can be reduced. Therefore, since the SiC produced due to the reaction between the graphite of the reaction container and SiO gas is reduced, the reaction container can be prevented from being cracked or broken.

Accordingly, since the reaction container can be prevented from being cracked and broken, the number of the replacements of the reaction container and the number of the repairs of the reaction container are reduced when the SiC powders are prepared by using the vacuum heat treatment apparatus. Accordingly, the preparing efficiency can be increased and the cost can be reduced.

Any reference in this specification to "one embodiment," "an embodiment," "example embodiment," etc., means that a particular feature, structure, or characteristic described in connection with the embodiment is comprised in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A method of preparing a reaction container for preparing silicon carbide powder, the method comprising:
   preparing a graphite mixture by mixing first and second graphite powders having particle sizes different from each other;
   preparing a graphite molded body by pressing the graphite mixture; and
   processing the graphite molded body,
   wherein density of the graphite molded body is in a range of about 1.8 g/cm$^3$ to about 2.1 g/cm$^3$, wherein the particle size of the first graphite powder is in a range of about 5 μm to about 50 μm,
wherein the particle size of the second graphite powder is in a range of about 0.02 μm on to about 2 μm, and
wherein a porosity of a graphic molded body is in a range of about 5% to about 20%.

2. A vacuum heat treatment apparatus for preparing silicon carbide powder, comprising:
a chamber;
a reaction container in the chamber; and
a heating member to heat the reaction container in the chamber,
wherein the reaction container comprises graphite, and has density of about 1.8 g/cm$^3$ to about 2.1 g/cm$^3$,
wherein the graphite comprises a graphite mixture obtained by mixing first and second graphite powders having particle sizes different from each other,
wherein the particle size of the first graphite powder is in a range of about 5 μm, to about 5 μm,
wherein the particle size of the second graphite powder is in a range of about 0.02 μm to about 2 μm, and
wherein the porosity of the reaction container is in a range of about 5% to about 20%.

3. A vacuum heat treatment apparatus for preparing silicon carbide powder, comprising:
a chamber;
a reaction container in the chamber;
mixing materials in the reaction container;
a heating member to heat the reaction container in the chamber,
wherein the mixing materials comprise a carbon source and a silicon source,
wherein the reaction container comprises graphite, has the carbon source impregnated in the reaction container, and has density of about 1.8 g/cm$^3$ to about 2.1 g/cm$^3$, and
wherein a porosity of the reaction container is in a range of about 5% to about 20%.

4. The vacuum heat treatment apparatus of claim 3, wherein the carbon source comprises at least one selected from the group consisting of phenol resin, furan resin, xylene resin, polyimide, polyurethane, polyacrylonitrile, poly (vinyl alcohol), poly (vinyl acetate), cellulose and a mixture thereof.

* * * * *